US008874312B2

(12) United States Patent
Park et al.

(10) Patent No.: US 8,874,312 B2
(45) Date of Patent: Oct. 28, 2014

(54) AUTOMOTIVE HEADLAMP CONTROL APPARATUS AND METHOD

(75) Inventors: Jong Ryoul Park, Gyeongsan (KR); Young Ho Son, Gyeongsan (KR); Ji Eun Lee, Gyeongsan (KR)

(73) Assignee: SL Corporation, Daegu (KR)

( * ) Notice: Subject to any disclaimer, the term of this patent is extended or adjusted under 35 U.S.C. 154(b) by 230 days.

(21) Appl. No.: 13/480,833

(22) Filed: May 25, 2012

(65) Prior Publication Data

US 2012/0314434 A1 Dec. 13, 2012

(30) Foreign Application Priority Data

Jun. 8, 2011 (KR) ........................ 10-2011-0055205

(51) Int. Cl.

*G06F 7/00* (2006.01)
*F21S 8/10* (2006.01)
*B60Q 1/14* (2006.01)

(52) U.S. Cl.

CPC ............. *F21S 48/1794* (2013.01); *B60Q 1/143* (2013.01); *B60Q 2300/056* (2013.01); *B60Q 2300/41* (2013.01); *B60Q 2300/42* (2013.01)
USPC ............................................... 701/36; 315/82

(58) Field of Classification Search

CPC ......................................................... B60Q 1/04
USPC ............... 701/36; 315/82, 149; 362/428, 287, 362/306, 269
See application file for complete search history.

(56) References Cited

U.S. PATENT DOCUMENTS

2009/0279317 A1* 11/2009 Tatara ........................... 362/465

FOREIGN PATENT DOCUMENTS

| | | | |
|---|---|---|---|
| KR | 10-0832516 | B1 | 5/2008 |
| KR | 10-2010-0073401 | A | 7/2010 |
| WO | 03-053737 | A1 | 7/2003 |

* cited by examiner

*Primary Examiner* — Thomas G Black
*Assistant Examiner* — Luke Huynh
(74) *Attorney, Agent, or Firm* — Edwards Wildman Palmer LLP; Kongsik Kim

(57) ABSTRACT

Provided are an automotive headlamp control apparatus and method which are employed to control an illumination pattern of a headlamp unit by rotating the headlamp unit and/or adjusting a light blocking region of the headlamp unit based on the position of a front vehicle located ahead in a driving direction. The automotive headlamp control apparatus includes an image capture unit capturing an image of an area ahead in a driving direction, a position determination unit determining a position of a front vehicle based on the captured image, a headlamp unit projecting light according to an illumination pattern formed by blocking part of light emitted from a light source, and a control unit controlling the illumination pattern of the headlamp unit by rotating the headlamp unit and/or adjusting a light blocking region of the headlamp unit based on the determined position of the front vehicle.

20 Claims, 22 Drawing Sheets

20
D
10

FIRST HEADLAMP(A)

SECOND HEADLAMP(A')

FIRST HEADLAMP(A)+SECOND HEADLAMP(A')

ROAD SURFACE PATTERN

FIRST HEADLAMP(B)

SECOND HEADLAMP(A')

FIRST HEADLAMP(B)+SECOND HEADLAMP(A')

ROAD SURFACE PATTERN

FIRST HEADLAMP(A)

SECOND HEADLAMP(B')

FIRST HEADLAMP(A)+SECOND HEADLAMP(B')

ROAD SURFACE PATTERN

FIRST HEADLAMP(B)

SECOND HEADLAMP(B')

FIRST HEADLAMP(B)+SECOND HEADLAMP(B')

ROAD SURFACE PATTERN

AUTOMOTIVE HEADLAMP CONTROL APPARATUS AND METHOD

CROSS-REFERENCE TO RELATED APPLICATION

This application claims priority from Korean Patent Application No. 10-2011-0055205 filed on Jun. 8, 2011 in the Korean Intellectual Property Office, the disclosure of which is incorporated herein by reference in its entirety.

BACKGROUND

1. Field of the Invention

The present invention relates to an automotive headlamp control apparatus and method, and more particularly, to an automotive headlamp control apparatus and method which are employed to control an illumination pattern of a headlamp unit by rotating the headlamp unit and/or adjusting a light blocking region of the headlamp unit based on the position of a front vehicle located ahead of the vehicle in a driving direction.

2. Description of the Related Art

All vehicles are typically equipped with automotive lamps. Automotive lamps generally have a lighting function and a signaling function, among others functions which vary depending upon model. In particular, automotive headlamps enable the driver of the vehicle to easily see objects around and ahead of the vehicle while driving at night or in a dark area. They also notify other vehicles and road users of where a vehicle is or intends on going. For example, headlamps and fog lamps are designed for providing light for the driver, and directional indicators, taillights, brake lights, and side markers are designed for providing signaling functions.

When a driver is driving a vehicle at night or through a dimly lit tunnel, light emitted from light sources used in headlamps or tail lamps of the vehicle enables the driver to see an area ahead of and behind the vehicle. Thus, this light ensures safe driving. Often, an automotive lamp includes an optical functional body and a plurality of reflective surfaces in order to properly disperse light emitted from light sources or polarize or concentrate refracted light to area in front of the vehicle.

Recently, there has been increasing demands for safety to ensure safe driving. For example, when a vehicle is being driven with headlamps on at night, the headlamps may dazzle the driver of a preceding or oncoming vehicle located ahead of the vehicle in the driving direction, thereby obstructing the driver's view. Accordingly, this can increase the probability of car accidents. Thus, a solution is necessary that can ensure the visibility of the driver of the vehicle without obstructing the view of drivers of the preceding or oncoming vehicles. One suggested solution is a system for automatically controlling headlamps of a vehicle, such as an adaptive front-light system (AFLS). AFLS can ensure driver visibility by obtaining information about road conditions based on an image of the road ahead and controlling an illumination pattern according to the road conditions. However, the conventional AFLS does not take into account the location of the preceding and oncoming vehicles and thus can still dazzle the drivers therein.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Aspects of the present invention provide an automotive headlamp control apparatus and method which are employed to determine the position of a front vehicle located ahead of a vehicle in a direction of travel and control an illumination pattern of the headlamp unit by rotating the headlamp unit and/or adjusting a light blocking region of the headlamp unit based on the determined position of the front vehicle.

Aspects of the present invention also provide an automotive headlamp control apparatus and method which are employed to ensure maximum possible driver visibility by forming an optimum illumination pattern by rotating a headlamp unit when an illumination pattern of the headlamp unit is controlled by adjusting a light blocking region of the headlamp unit.

Aspects of the present invention also provide an automotive headlamp control apparatus and method which are employed to compensate for a shadow zone which is formed by the rotation of a headlamp unit and does not contribute to the visibility of a front vehicle located ahead in a driving direction.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided an automotive headlamp control apparatus including an image capture unit configured to capture an image of an area in a direction of travel, a position determination unit configured to determine a position of a front vehicle based on the captured image, a headlamp unit projecting light according to an illumination pattern formed by blocking part of light emitted from a light source, and a control unit configured to control the illumination pattern of the headlamp unit by rotating the headlamp unit and/or adjusting a light blocking region of the headlamp unit based on the determined position of the front vehicle.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE DISCLOSURE

Figure 1:
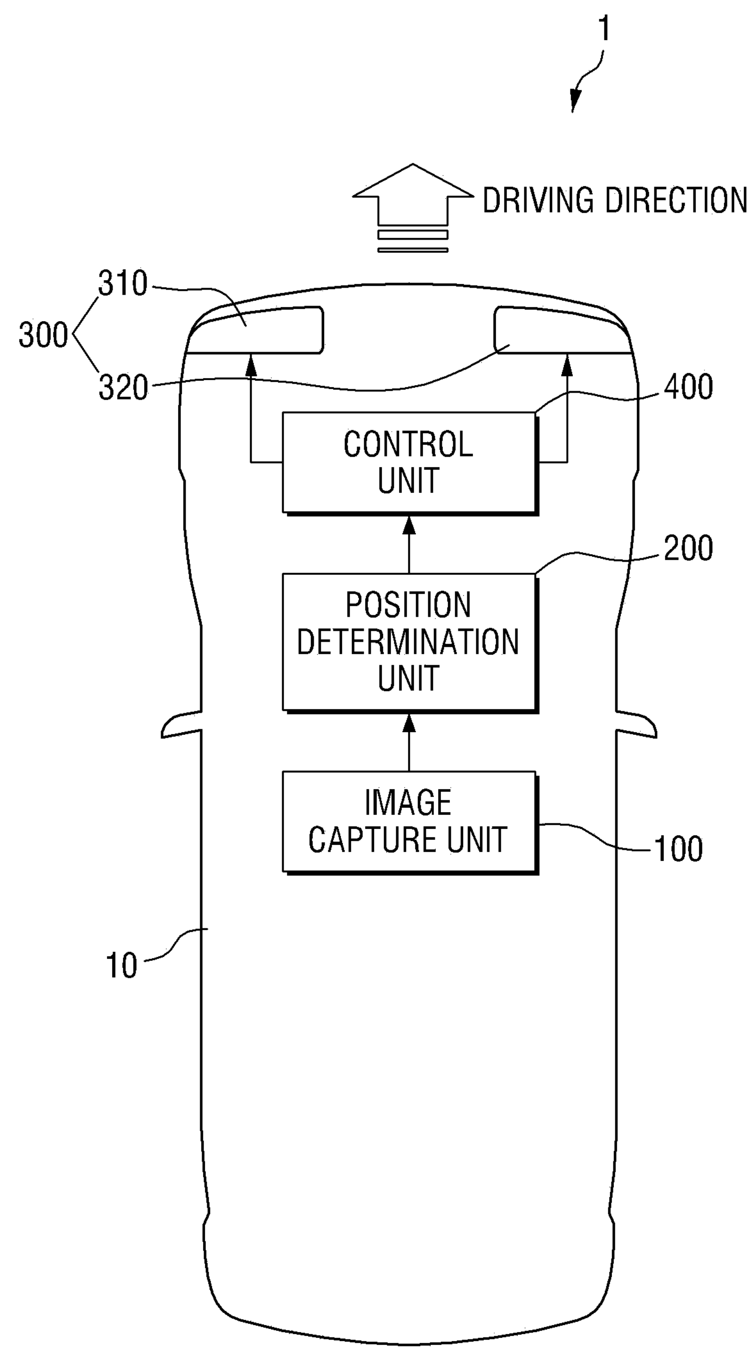
FIG. 1 is a schematic diagram of an automotive headlamp control apparatus according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the below exemplary embodiments are described as using a plurality of units to perform the processes below, it is understood that the below processes may also be performed by a single controller or control unit as well without departing from the overall aspects of the present invention.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof. As used herein, the term "and/or" includes any and all combinations of one or more of the associated listed items.

Embodiments of the invention are described herein with reference to cross-section and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description.

Hereinafter, an automotive headlamp control apparatus and method according to embodiments of the present invention will be described with reference to the attached drawings.

FIG. 1 is a schematic diagram of an automotive headlamp control apparatus 1 according to an embodiment of the present invention.

Referring to FIG. 1, the automotive headlamp control apparatus 1 according to the illustrative embodiment may include an image capture unit 100 which captures an image of an area ahead in a driving direction, a position determination unit 200 which determines the position of a preceding or oncoming vehicle based on the captured image, a headlamp unit 300 which projects light according to an illumination pattern formed by blocking part of the light emitted from a light source, and a control unit 400 which controls the illumination pattern of the headlamp unit 300 by determining a shadow zone based on the determined position of the preceding or oncoming vehicle and rotating the headlamp unit 300 and/or adjusting a light blocking region of the headlamp unit 300 to form the determined shadow zone. In illustrative embodiments of the present invention, an oncoming or preceding vehicle will be herein referred to as a "front vehicle."

The image capture unit 100 may include a camera module (not shown) which may be installed at a predetermined position on a vehicle 10 and configured to capture an image of an area in front of the vehicle 10 in the direction of travel of the vehicle 10. The image capture unit 100 may transmit the captured image to the position determination unit 200. The image capture unit 100 may be installed on the front of the vehicle 10 or on an inside mirror (e.g., the rear view mirror). However, this is merely an example used to help understand the present invention, and the present invention is not limited to this example. The installation position of the image capture unit 100 may vary according to the model or use of the vehicle 10 and as necessary. Also, the image capture unit 100 may include a camera module for capturing an image of an area behind the vehicle 10 or an area on a side of the vehicle 10, in addition to the camera module for capturing an image of an area in front of the vehicle 10.

For ease of data transmission, the camera module of the image capture unit 100 may convert a captured image into a compression format before transmitting the captured image. Various conventional formats such as MPEG-1 and MPEG-4 can be used as the compression format. As such, the image capture unit 100 may include a processor for converting the format of data.

The position determination unit 200 may determine the position of a front vehicle based on an image captured by the image capture unit 100. The position determination unit 200 may distinguish a preceding vehicle from an oncoming vehicle based on an optical wavelength difference between headlamps and tail lamps or based on the position of a centerline shown in the captured image. Here, the captured image may contain light emitted not only from the headlamps or the tail lamps but also from other light sources such as streetlamps or neon signs. Therefore, the position determination unit 200 may recognize light existing inside right and left boundary points of the road as a vehicle or recognize only a pair of similar intensities of illumination and a pair of similar light distribution patterns as headlamps or tail lamps. These methods used by the position determination unit 200 to determine the position of a front vehicle are mere examples used to help understand the present invention, and thus various conventional methods can also be used in addition to the above methods.

High beams can widen the field of view of a driver of the vehicle 10 during night time driving. On the other hand, the high beams can dazzle a driver of a front vehicle, thereby obstructing the driver's view. This increases the probability of car accidents. Therefore, the position determination unit 200 determines the position of a front vehicle in order to appropriately control the high beams according to the position of the front vehicle. In the illustrative embodiment, the position determination unit 200 determines the position of a front vehicle based on an image provided by the image capture unit 100 and automatically controls the high beams without manipulation of the driver.

That is, the position determination unit 200 ensures safe driving by automatically controlling the high beams without manipulation of the driver when the vehicle 10 is being driven with its high beams on, controlling the high beams to not obstruct the view of a driver of a front vehicle, and controlling the high beams to secure maximum visibility for the driver of the vehicle 10.

The headlamp unit 300 may include a first headlamp 310 and a second headlamp 320. In the illustrative embodiment, a case where the first headlamp 310 is a left headlamp installed on a front left side of the vehicle 10 and the second headlamp 320 is a right headlamp installed on a front right side of the vehicle 10 will be described as an example.

Figure 2:
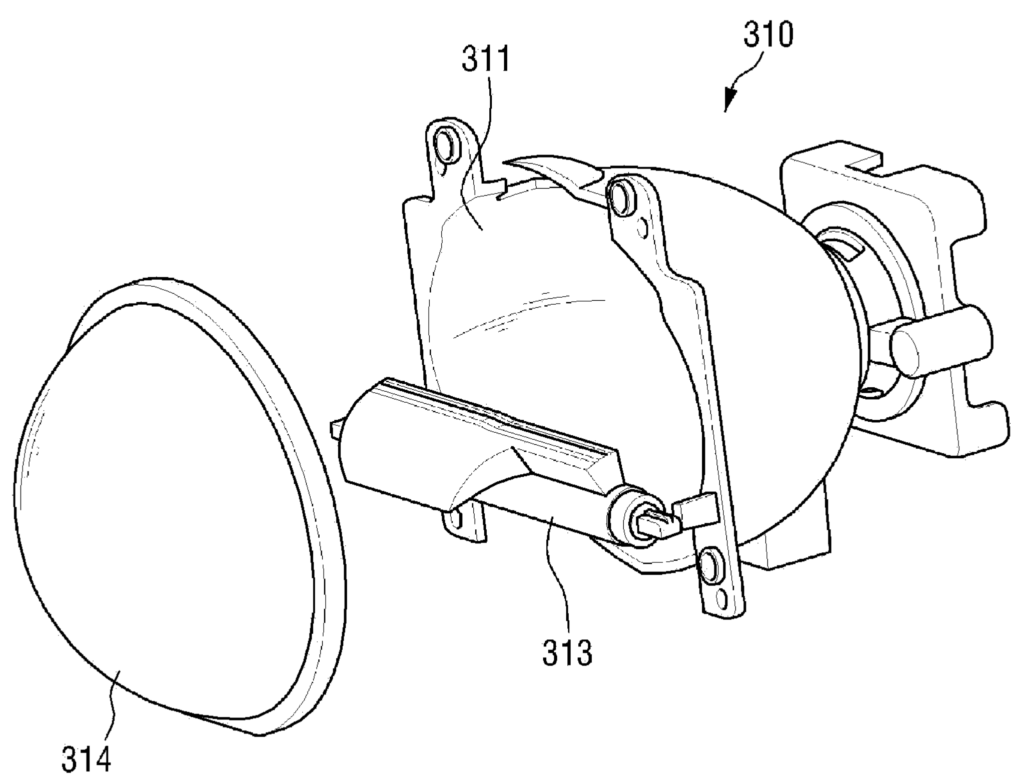
FIG. 2 is a perspective view of a first headlamp shown in FIG. 1.
Figure 3:
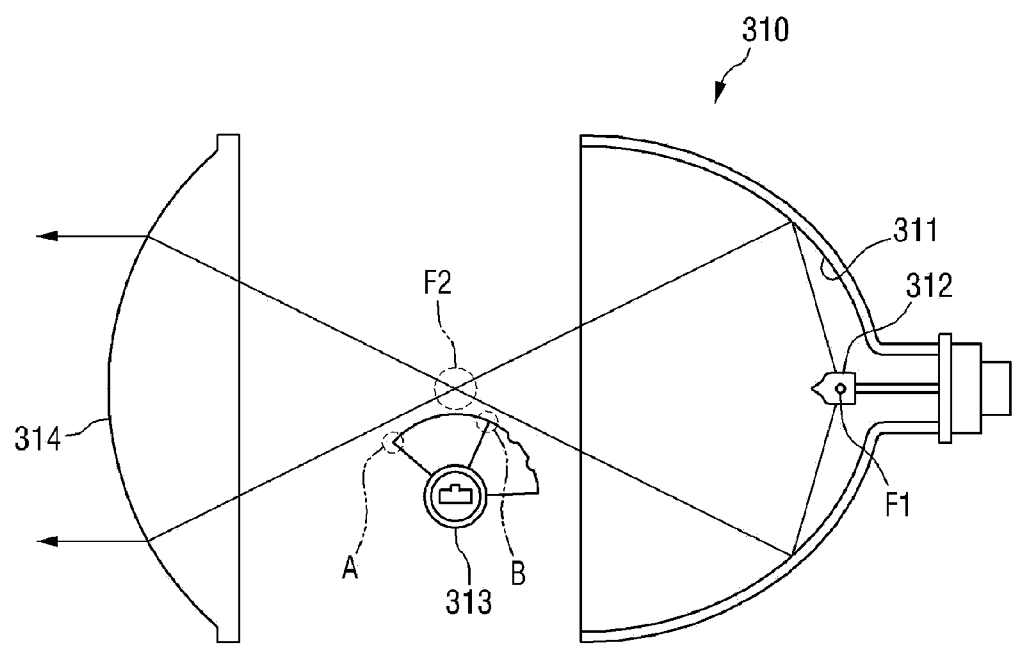
FIG. 3 is a schematic side view of the first headlamp shown in FIG. 2.
Figure 4:
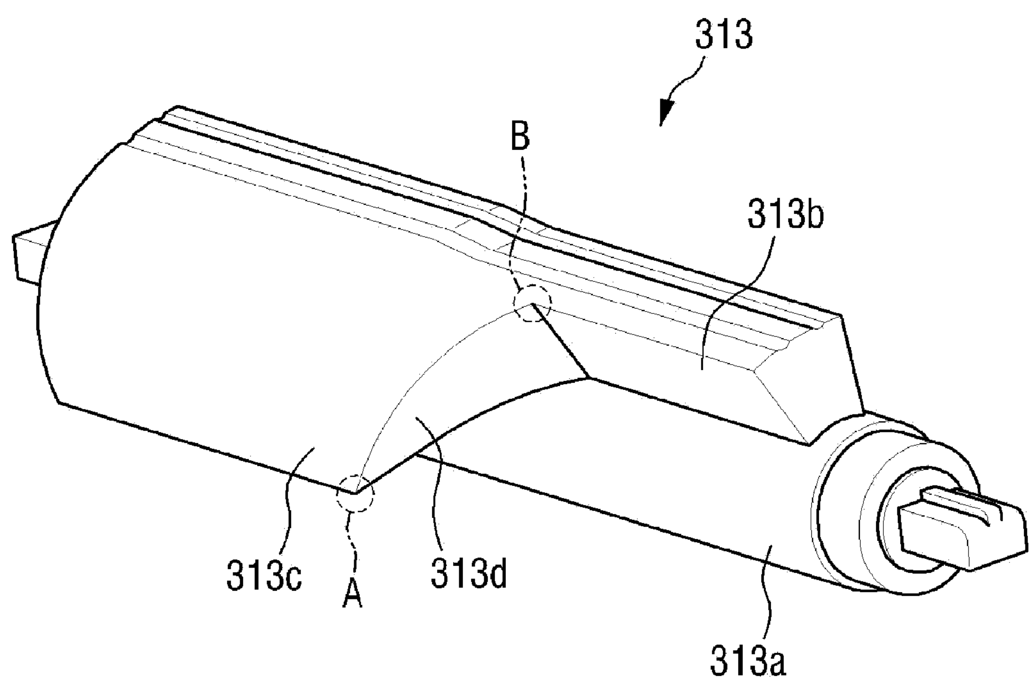
FIG. 4 is a perspective view of a light blocking unit of the first headlamp shown in FIG. 2.

FIG. 2 is a perspective view of the first headlamp 310 shown in FIG. 1. FIG. 3 is a schematic side view of the first headlamp 310 shown in FIG. 2. FIG. 4 is a perspective view of a light blocking unit 313 of the first headlamp 310 shown in FIG. 2.

Referring to FIGS. 2 through 4, the first headlamp 310 according to the illustrative embodiment may include an ellipsoidal reflector 311, a light source 312 located at a first focus F1 of the reflector 311, the light blocking unit 313 which is located near a second focus F2 of the reflector 311 and blocks part of light emitted from the light source 312 according to an illumination pattern, and a lens 314 which projects light toward the front of the vehicle 10. In the illustrative embodiment of the present invention, the light source 312 included in the first headlamp 310 may be, but is not limited to, a projector-type light-emitting module or a light-emitting diode (LED).

The light blocking unit 313 may include a cylindrical rotatable body 313*a*, a first blocking portion 313*b* which blocks part of light according to an illumination pattern corresponding to driving conditions of the vehicle 10, and a second blocking portion 313*c* which blocks part of light according to an illumination pattern for the high beams.

The first blocking portion 313*b* may block part of light emitted from the light source 312 according to an illumination pattern (such as Class-C, Class-V, Class-E or Class-W) corresponding to driving conditions (such as driving speed, road characteristics, road surface conditions, lane direction, etc.) of the vehicle 10.

The illumination patterns Class-C, Class-V, Class-E and Class-W may be defined as follows.

Class-C is an illumination pattern suitable for use when the vehicle 10 is driving on a country road or when there is no need to apply other illumination patterns since the vehicle 10 is driving in no special conditions. Class-V is an illumination pattern applicable when the vehicle 10 is driving in an environment (e.g., on city roads) in which more than a certain level of brightness is secured by ambient lighting. Class-E is an illumination pattern applicable when the vehicle 10 is driving on expressways or on mostly straight roads. Class-W is an illumination pattern applicable when the vehicle 10 is driving on wet roads in the rain.

The second blocking portion 313*c* is controlled by the control unit 400 to form a shadow zone corresponding to the position of a front vehicle determined by the position determination unit 200. The shadow zone formed by the second light blocking portion 313*c* prevents glare to the driver of the front vehicle, thereby preventing the obstruction of the driver's view.

The body 313*a* of the light blocking unit 313 rotates according to the position of a front vehicle to place any one of the first blocking portion 313*b* and the second blocking portion 313*c* near the second focus F2. Accordingly, part of light emitted from the light source 312 is blocked by any one of the first blocking portion 313*b* and the second blocking portion 313*c*. In the illustrative embodiment of the present invention, a case where part of light emitted from the light source 312 is blocked by the first blocking portion 313*b* and the second blocking portion 313*c* is described as an example. However, this is merely an example used to help understand the present invention, and the present invention is not limited to this example. That is, all of the light emitted from the light source 312 can also be blocked by the first blocking portion 313*b* and the second blocking portion 313*c*.

In addition, a case where the automotive headlamp control apparatus 1 according to the illustrative embodiment controls the illumination pattern for the high beams according to the position of a front vehicle will be described as an example, and a detailed description of illumination pattern control according to the driving conditions of the vehicle 10 will be omitted. Also, although no special description is given of an illumination pattern according to the driving conditions of the vehicle 10, a case where an appropriate illumination pattern is applied according to the driving conditions (such as driving speed, road characteristics, road surface conditions, lane direction, etc.) of the vehicle 10 will be described as an example.

The second blocking portion 313*c* may include a step portion 313*d*. The step portion 313*d* is angled according to a lengthwise-axis direction of the body 313*a* such that a light blocking region for the high beams is increased or reduced as the body 313*a* rotates. The angle between the body 313*a* and the step portion 313*d* may vary according to road conditions. An end of the step portion 313*d* is located in the middle of the body 313*a*. The step portion 313*a* may extend along a circumference of the body 313*a* to gradually become closer to an end of the body 313*a*. In the illustrative embodiment, the step portion 313*d* extends from the middle of the body 313*a* to a position close to an end of the body 313*a*. However, the step portion 313*d* does not extend to the end of the body 313*a*. This is because the entire region is blocked for the high beams since the first blocking portion 313*b* formed on a side of the second blocking portion 313*c* blocks part of light according to an illumination pattern corresponding to the driving conditions of the vehicle 10. When the entire region needs to be blocked for the high beams while an illumination pattern according to the driving conditions of the vehicle 10 is not needed, the step portion 313*d* may extend to the end of the body 313*a*.

The step portion 313*d* extends from the middle of the body 313*a* to a position close to an end of the body 313*a* because the first headlamp 310 which is a left headlamp projects light to the left of a centerline of the vehicle 10 and the second headlamp 320 which is a right headlamp projects light to the right of the centerline of the vehicle 10. Therefore, when the middle of the step portion 313*d* of the second blocking portion 313*c* is located at the second focus F2, the first headlamp 310 may have a high beam illumination pattern when there is no front vehicle, and a light blocking region of the first headlamp 310 may be increased by the step portion 313*b* as the body 313*a* rotates accordingly.

For example, when a point A of the step portion 313*d* is located near the second focus F2, the high beam illumination pattern corresponding to when there is no front vehicle is formed. As a point B of the step portion 313*d* becomes closer to the second focus F2 by the rotation of the body 313*a*, the light blocking region of the first headlamp 310 may increase to form a shadow zone.

Figure 5:
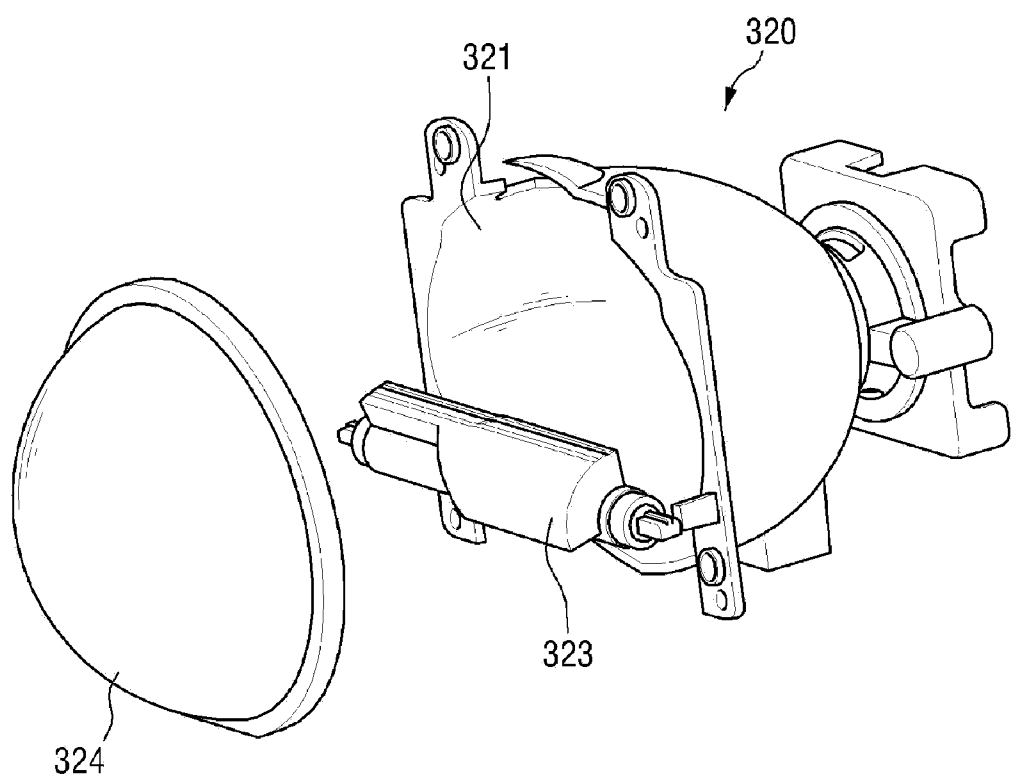
FIG. 5 is a perspective view of a second headlamp shown in FIG. 1.
Figure 6:
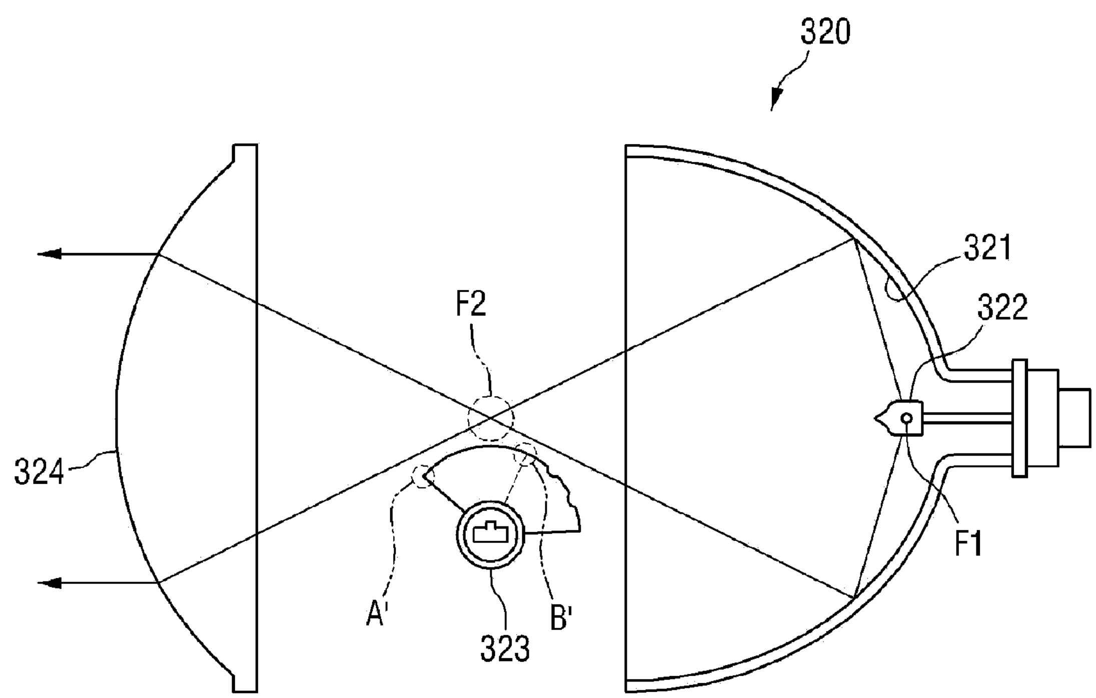
FIG. 6 is a schematic side view of the second headlamp shown in FIG. 5.
Figure 7:
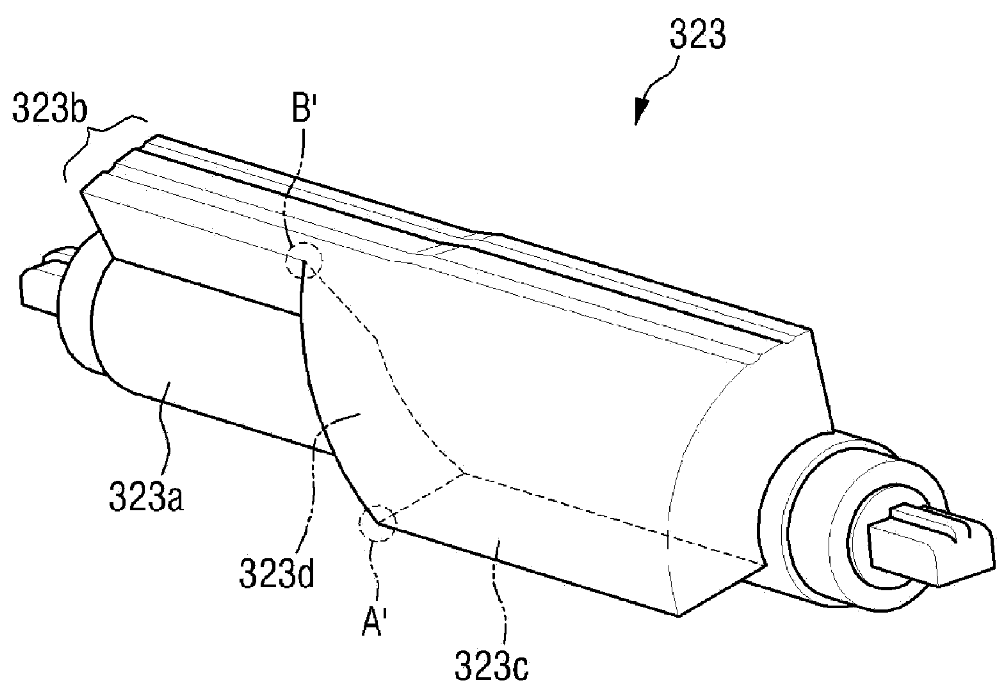
FIG. 7 is a perspective view of a light blocking unit of the second headlamp shown in FIG. 5.
Figure 8:
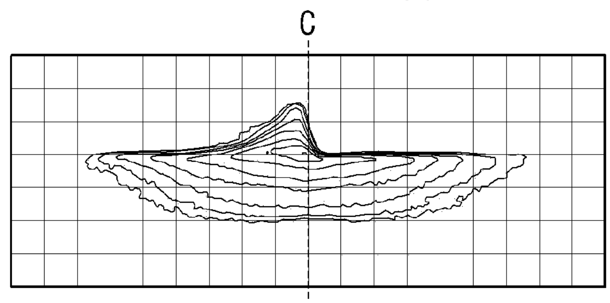
FIGS. 8 through 11 are schematic diagrams of illumination patterns and road surface patterns formed by a headlamp unit according to exemplary embodiments of the present invention.
Figure 8:
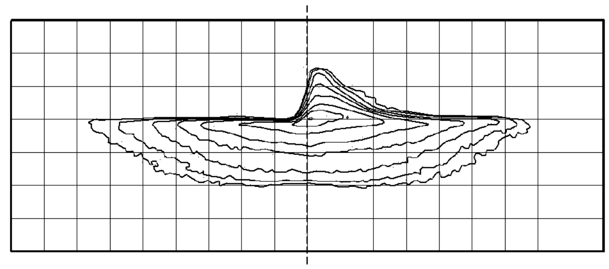
Figure 8:
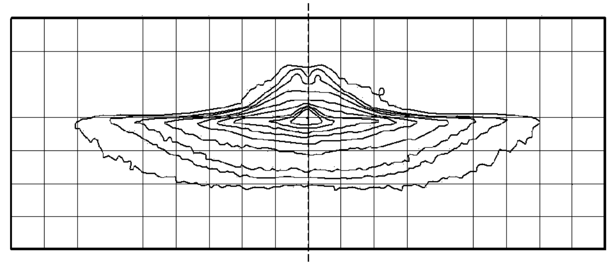
Figure 8:
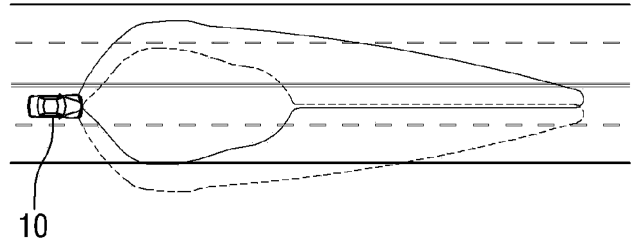
Figure 9:
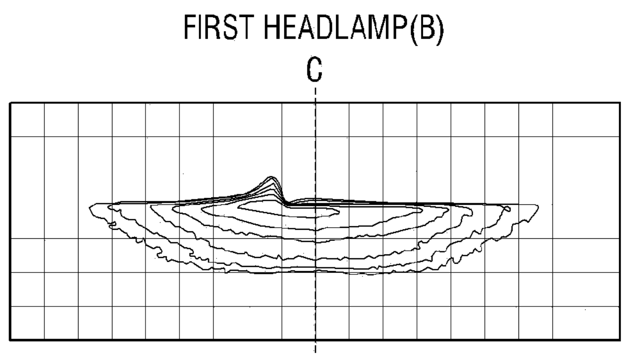
Figure 9:
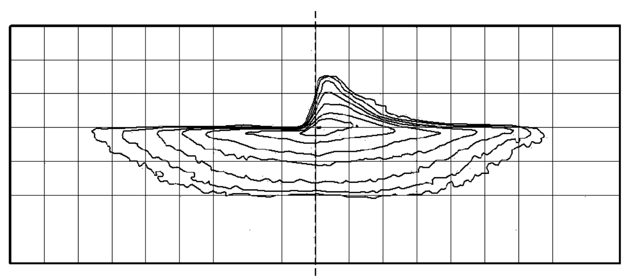
Figure 9:
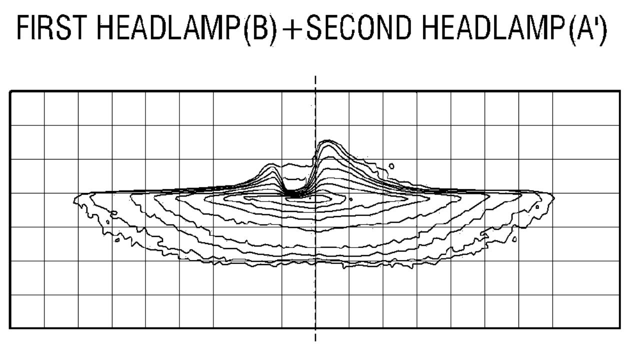
Figure 9:
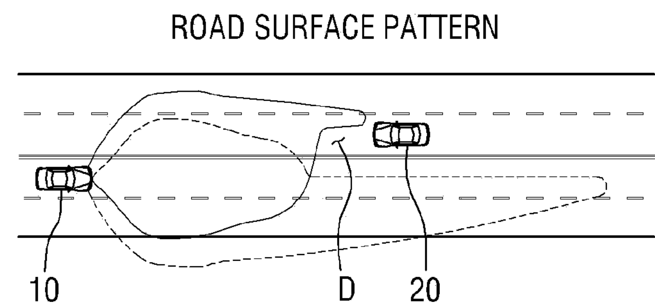
Figure 10:
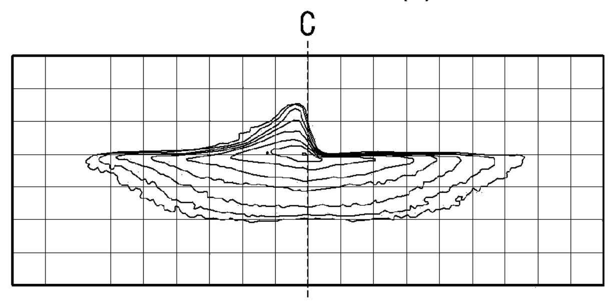
Figure 10:
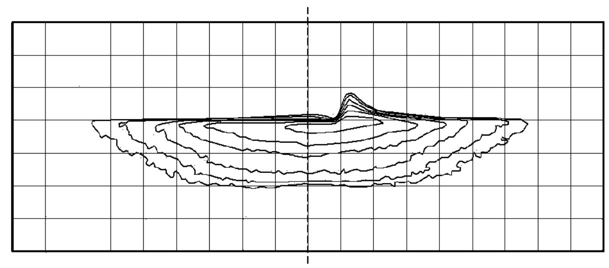
Figure 10:
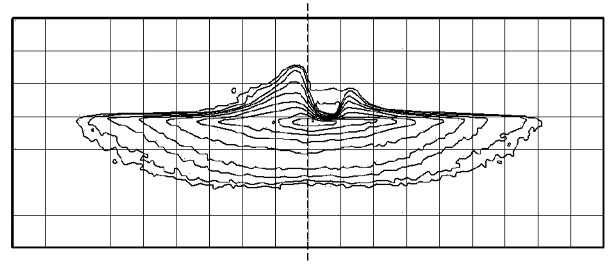
Figure 10:
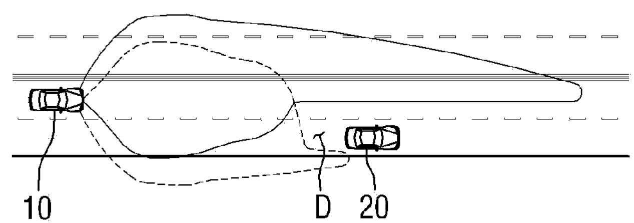
Figure 11:
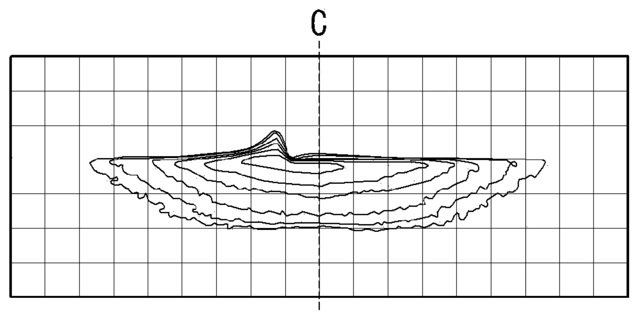
Figure 11:
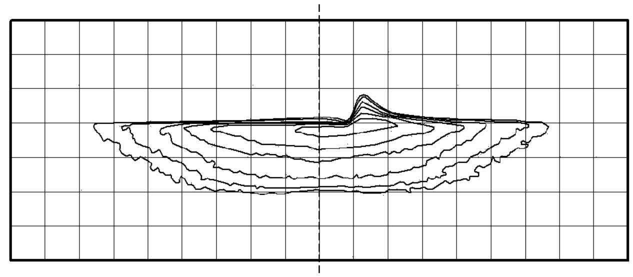
Figure 11:
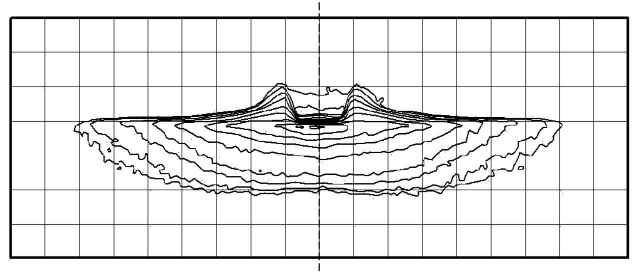
Figure 11:
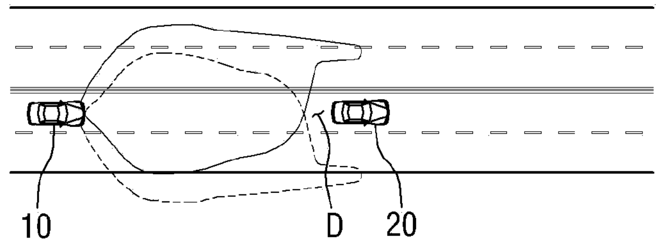

FIG. 5 is a perspective view of the second headlamp 320 shown in FIG. 1. FIG. 6 is a schematic side view of the second headlamp 320 shown in FIG. 5. FIG. 7 is a perspective view of a light blocking unit 323 of the second headlamp 320 shown in FIG. 5.

Referring to FIGS. 5 through 7, like the first headlamp 310, the second headlamp 320 according to the illustrative embodiment may include a reflector 321, a light source 322, the light blocking unit 323, and a lens 324. The light blocking unit 323 may include a body 323*a*, a first blocking portion 323*b*, a second blocking portion 323*c*, and a step portion 323*d*.

Functions of the elements 321, 322, 323 and 3234 of the second headlamp 320 are similar to those of their counterparts of the first headlamp 310, and thus a detailed description thereof will be omitted. Since the second headlamp 320 projects light in an opposite direction of the first headlamp 310, that is, projects light to the right of the centerline of the vehicle 10 and changes an illumination pattern, an installation direction of the light blocking unit 323 of the second headlamp 320 is opposite to that of the light blocking unit 313 of the first headlamp 310.

Therefore, when a point A' is located near a second focus F2 in the second headlamp 320, the illumination pattern corresponding to the case where there is no front vehicle may be formed. As a point B' becomes closer to the second focus F2 by the rotation of the body 323*a*, a light blocking region of the second headlamp 320 may increase to form a shadow zone.

FIGS. 8 through 11 are schematic diagrams of illumination patterns and road surface patterns formed by the headlamp unit 300 according to the present invention. FIGS. 8A-D illustrate a high beam illumination pattern and a road surface pattern corresponding to when there is no vehicle ahead of the vehicle 10. Referring to FIGS. 8A-D, the point A of the second blocking portion 313*c* of the first headlamp 310 is located near the second focus F2, and the point A' of the second blocking portion 323*c* of the second headlamp 320 is located near the second focus F2. FIG. 8A illustrates the illumination pattern of the first headlamp 310 when the blocking portion 313*c* is at point A and FIG. 8B represents the illumination pattern of the second headlamp 320 when the blocking portion 323*c* is at point A'. FIG. 8C is an illumination pattern of the combination of the FIGS. 8A-B and FIG. 8D illustrates an overhead view of the road pattern generated by FIG. 8C.

FIGS. 9A-D illustrate a high beam illumination pattern and a road surface pattern corresponding to a case where a front vehicle 20 located ahead of the vehicle 10 is an oncoming vehicle. When there is an oncoming vehicle, the light blocking unit 313 of the first headlamp 310 rotates to place the point B of the step portion 313*d* near the second focus F2. Accordingly, a shadow zone D corresponding to the position of the incoming vehicle is formed. Here, the second light blocking unit 323 of the second headlamp 320 does not rotate, and the point A' is located near the second focus F2. FIG. 9A illustrates the illumination pattern of the first headlamp 310 when the blocking portion 313 rotates to point B and FIG. 9B represents the illumination pattern of the second headlamp 320 when the blocking portion 323 is at point A'. FIG. 9C is an illumination pattern of the combination of the FIGS. 9A-B and FIG. 9D illustrates an overhead view of the road pattern generated by FIG. 9C.

FIGS. 10A-D illustrate a high beam illumination pattern and a road surface pattern corresponding to a case where a front vehicle 20 located ahead of the vehicle 10 is a preceding vehicle, in particular, a preceding vehicle in a different lane from the vehicle 10. When there is a preceding vehicle in a different lane, the light blocking unit 323 of the second headlamp 320 rotates to place the point B' of the step portion 323*d* near the second focus F2. Accordingly, a shadow zone D may be formed for the preceding vehicle in the different lane. Here, the light blocking unit 313 of the first headlamp 310 does not rotate, and the point A is located near the second focus F2. FIG. 10A illustrates the illumination pattern of the first headlamp 310 when the blocking portion 313 is at point A and FIG. 10B represents the illumination pattern of the second headlamp 320 when the blocking portion 323 is rotated to point B'. FIG. 10C is an illumination pattern of the combination of the FIGS. 10A-B and FIG. 10D illustrates an overhead view of the road pattern generated by FIG. 10C.

FIGS. 11A-D illustrate a high beam illumination pattern corresponding to a case where a front vehicle 20 located ahead of the vehicle is a preceding vehicle, in particular, a preceding vehicle in the same lane as the vehicle 10. When there is a preceding vehicle in the same lane, the light blocking unit 313 of the first headlamp 310 and the light blocking unit 323 of the second headlamp 320 rotate to respectively place the points B and B' of the step portions 313*d* and 323*d* at the second focus F2. Accordingly, a shadow zone D may be formed for the preceding vehicle in the same lane. FIG. 11A illustrates the illumination pattern of the first headlamp 310 when the blocking portion 313 is rotated to point B and FIG. 11B represents the illumination pattern of the second headlamp 320 when the blocking portion 323 is rotated to point B'. FIG. 11C is an illumination pattern of the combination of the FIGS. 11A-B and FIG. 11D illustrates an overhead view of the road pattern generated by FIG. 11C.

In FIGS. 8 through 11, a case where only the points A, A', B and B' of the step portions 313*d* and 323*d* of the first and second headlamps 310 and 320 are placed near the second focus F2 is described as an example. However, this is merely an example used to help understand the present invention, and the present invention is not limited to this example. An arbitrary point between A and B and an arbitrary point between A' and B' can also be placed near the second focus F2 according to the position of a front vehicle or the distance to the front vehicle, thereby forming an appropriate shadow zone.

Figure 12:
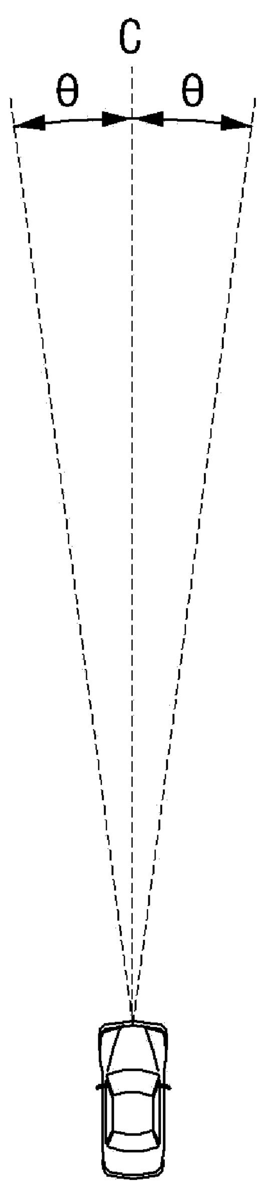
FIG. 12 is a schematic diagram of an angle range based on which a shadow zone is formed by rotating the headlamp unit according to an exemplary embodiment of the present invention.

In the above embodiment of the present invention, a case where a shadow zone is formed according to the position of a front vehicle by rotating the light blocking units 313 and 323 of the first and second headlamps 310 and 320 has been described as an example. However, the present invention is not limited to this example. When the front vehicle exists within a predetermined angular range θ with respect to the centerline C of the vehicle 10 as shown in FIG. 12, the shadow zone can be formed by rotating one or more of the first headlamp 310 and the second headlamp 320. Here, the first headlamp 310 and the second headlamp 320 may have equal or different rotatable ranges. The rotatable range may vary according to the vehicle model or road conditions.

Figure 13:
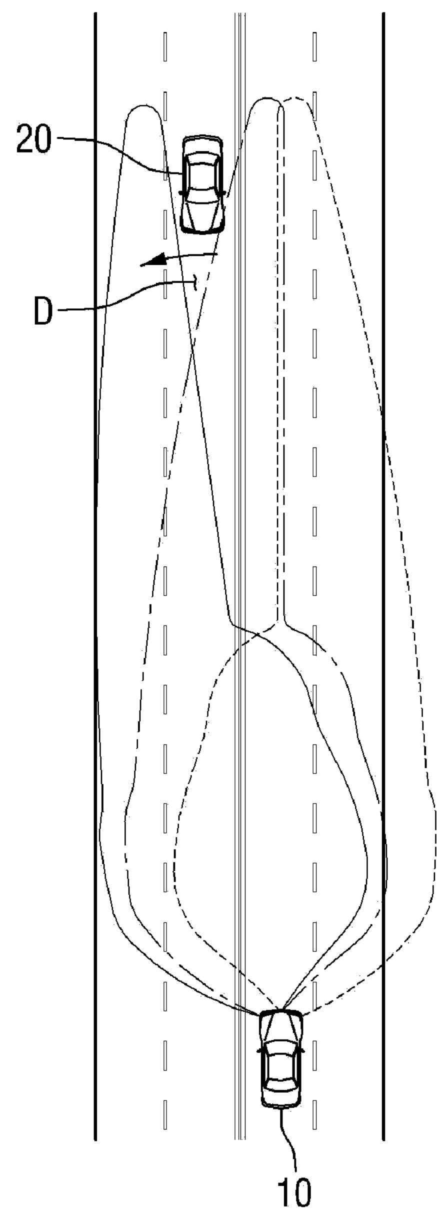
FIG. 13 is a schematic diagram of a shadow zone formed by rotating the headlamp unit according to an exemplary embodiment of the present invention.

For example, referring to FIG. 13, when a front vehicle 20 is an oncoming vehicle and exists within the predetermined angle range θ of FIG. 12, a shadow zone D may be formed not by controlling a light blocking region according to the position of the oncoming vehicle but by rotating the first headlamp 310. In FIG. 13, the shadow zone D is formed for the oncoming vehicle by rotating the first headlamp 310 only. However, this is merely an example used to help understand the present invention, and the present invention is not limited to this example. That is, both of the first headlamp 310 and the second headlamp 320 can also be rotated.

Figure 14:
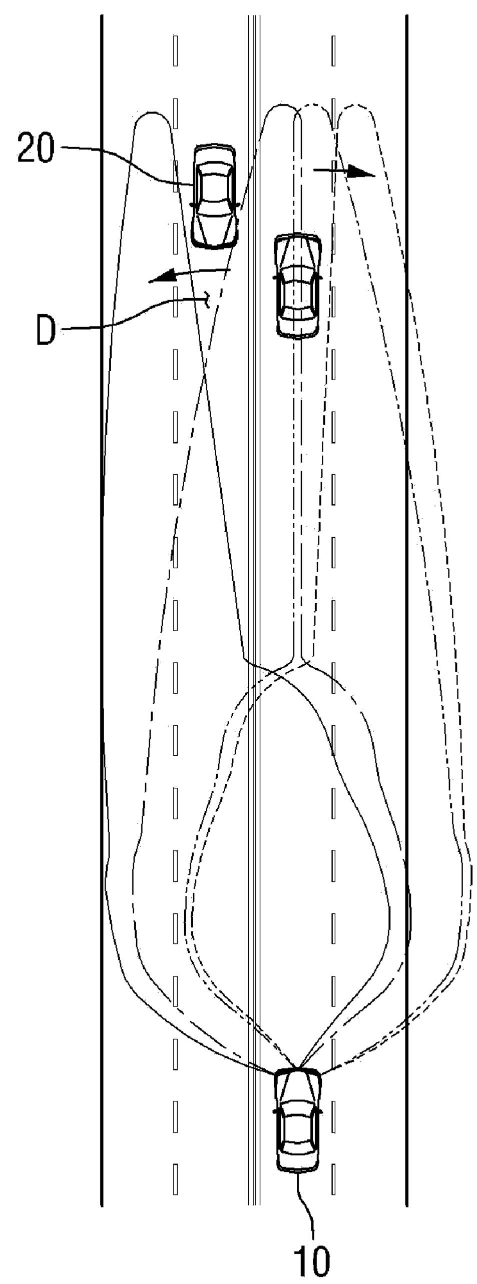
FIG. 14 is a schematic diagram of a shadow zone formed by rotating the headlamp unit when there are multiple front vehicles according to an exemplary embodiment of the present invention.

Referring to FIG. 14, when multiple front vehicles, e.g., an oncoming vehicle and a preceding vehicle, are located ahead of the vehicle 10, a shadow zone D may be formed by rotating the first headlamp 310 and the second headlamp 320. When both of the oncoming vehicle and the preceding vehicle exist within the predetermined angle range θ of FIG. 12, the shadow zone D may be formed by rotating the first headlamp 310 and the second headlamp 320. When there are multiple front vehicles ahead of the vehicle 10, a shadow zone may be formed based on a leftmost vehicle and a rightmost vehicle.

The control unit 400 may control the illumination pattern of the headlamp unit 300 through control logic by rotating the headlamp unit 300 and/or adjusting the light blocking region of the headlamp unit 300 based on the position of a front vehicle determined by the position determination unit 200. In so doing, the control unit 400 may form a shadow zone corresponding to the position of the front vehicle.

When a front vehicle is located within a predetermined angular range θ with respect to the centerline of the vehicle 10, the control unit 400 may form a shadow zone by rotating the headlamp unit 300. When the front vehicle is located outside the predetermined angular range θ, the control unit 400 may form the shadow zone by adjusting the light blocking region of the headlamp unit 300.

Further, when there are multiple front vehicles and when some of the front vehicles exist within the predetermined angular range θ while the other front vehicles exist outside the predetermined angular range θ, the control unit 400 may form shadow zones by rotating the headlamp unit 300 and adjusting the light blocking region of the headlamp unit 300.

In the illustrative embodiment, the control unit 400 forms a shadow zone through control logic which rotates the headlamp unit 300 when a front vehicle exists within a predetermined angular range θ with respect to the centerline of the vehicle 10 and forms the shadow zone by adjusting the light blocking region of the headlamp unit 300 when the front vehicle exists outside the predetermined angular range θ. However, this is merely an example used to help understand the present invention, and the present invention is not limited to this example. That is, the control unit 400 can form the shadow zone by adjusting the light blocking region even when the front vehicle exists within the predetermined angular range θ with respect to the centerline of the vehicle 10 and form the shadow zone by rotating the headlamp unit 300 even when the front vehicle exists outside the predetermined angular range θ.

After the control unit 400 forms a shadow zone according to the position of a front vehicle using the above methods, it may optimize the shadow zone. For example, when a shadow zone is wider than a front vehicle and thus reduces driver visibility of the vehicle 10, the control unit 400 may reduce the shadow zone by rotating one or more of the first headlamp 310 and the second headlamp 320 in an inward direction of the vehicle 10, thereby ensuring maximum visibility for the driver of the vehicle 10.

Figure 15:
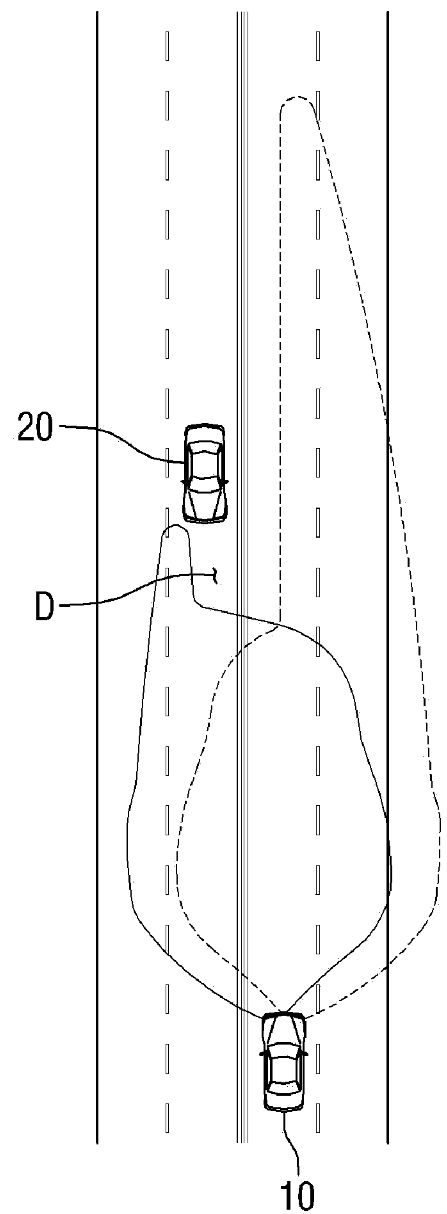
FIGS. 15 and 16 are schematic diagrams illustrating a process of optimizing a shadow zone by adjusting a light blocking region of the first headlamp according to an exemplary embodiment of the present invention.
Figure 16:
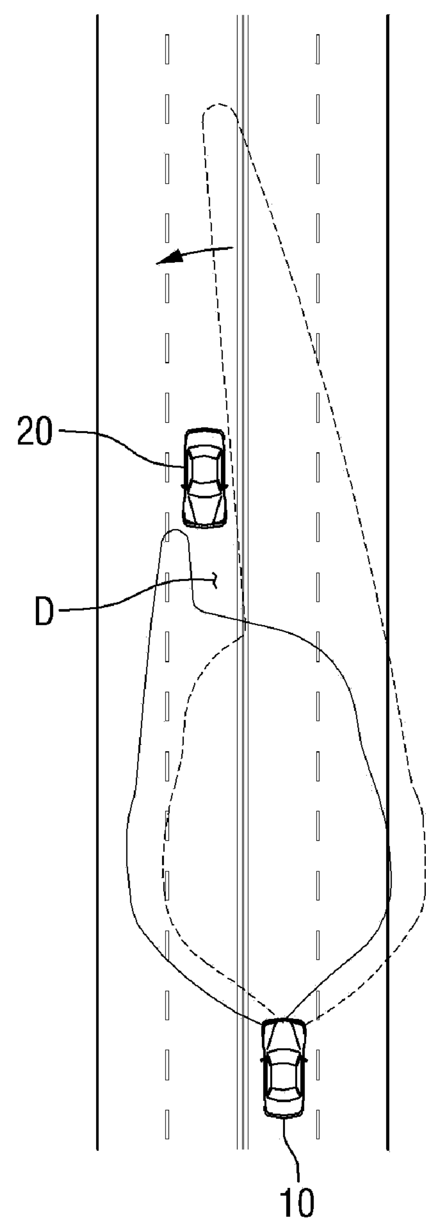

For example, when a shadow zone is formed by adjusting the light blocking region of the first headlamp 310 as shown in FIG. 15, it may be optimized by adjusting one or more of left and right ends of the shadow zone to one or more of left and right sides of a front vehicle by rotating the second headlamp 320 in the inward direction of the vehicle 10, as shown in FIG. 16. As a result, maximum visibility can be ensured for the driver of the vehicle 10.

Figure 17:
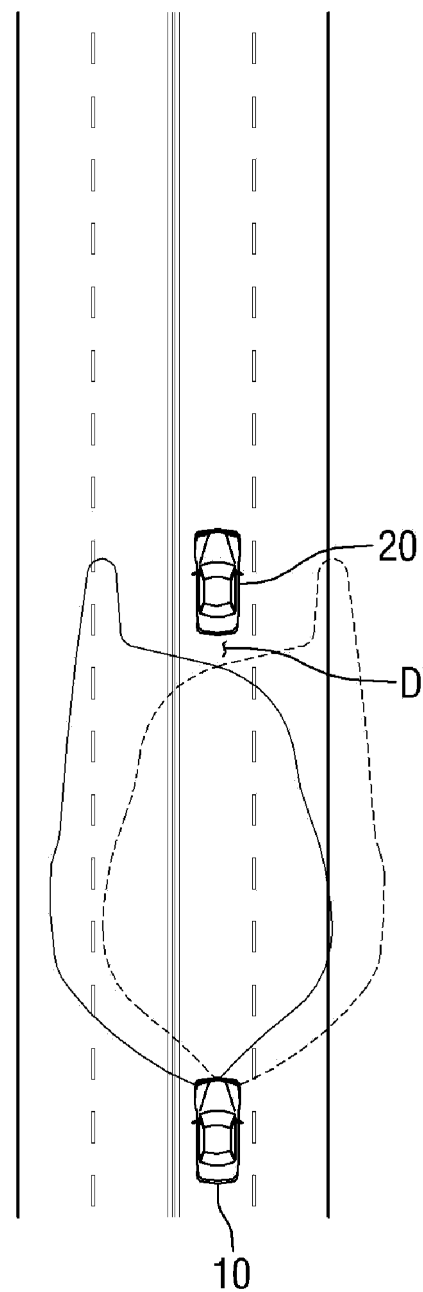
FIGS. 17 and 18 are schematic diagrams illustrating a process of optimizing a shadow zone by adjusting light blocking regions of the first and second headlamps according to an exemplary embodiment of the present invention.
Figure 18:
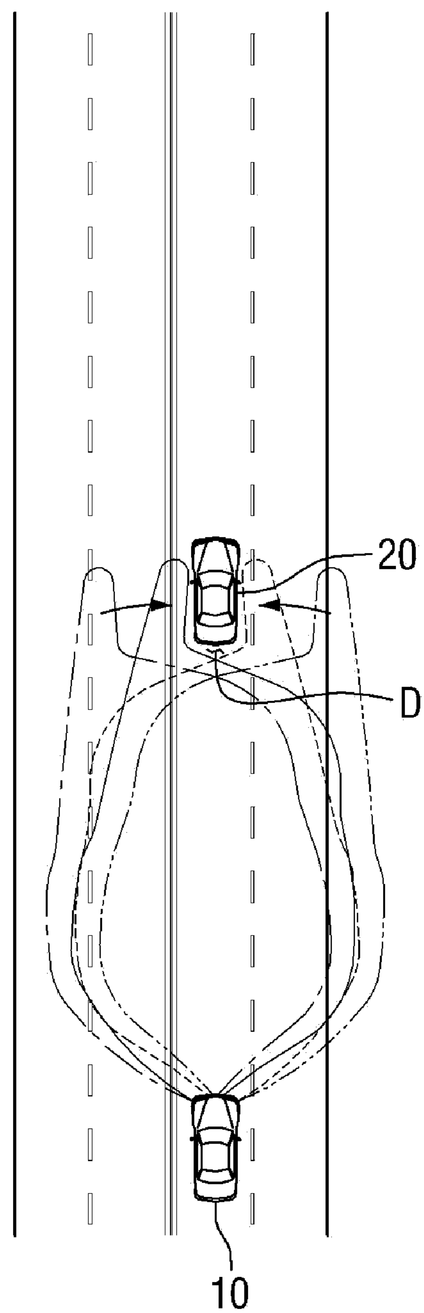

In addition, when a shadow zone is formed by adjusting the light blocking regions of both of the first and second headlamps 310 and 320 as shown in FIG. 17, it may be optimized by adjusting one or more of left and right ends of the shadow zone to one or more of left and right sides of a front vehicle by rotating both of the first headlamp 310 and the second headlamp 320 in the inward direction of the vehicle 10 as shown in FIG. 18. As a result, maximum visibility can be ensured for the driver of the vehicle 10.

When a shadow zone formed by rotating the headlamp unit 300 and/or adjusting the light blocking region of the headlamp unit 300 is wider than a front vehicle, some portions of the shadow zone may be unnecessary. In the illustrative embodiment, optimizing the shadow zone can be understood as removing the unnecessary portions of the shadow zone. In addition, when a shadow zone is formed by increasing the light blocking region of any one of the first headlamp 310 and the second headlamp 320, the increased light blocking region may cause a corresponding high illuminance region to be lost. To compensate for the corresponding high illuminance region, the other one of the first headlamp 310 and the second headlamp 320 may be rotated to ensure maximum possible visibility using the other high illuminance region.

Figure 19:
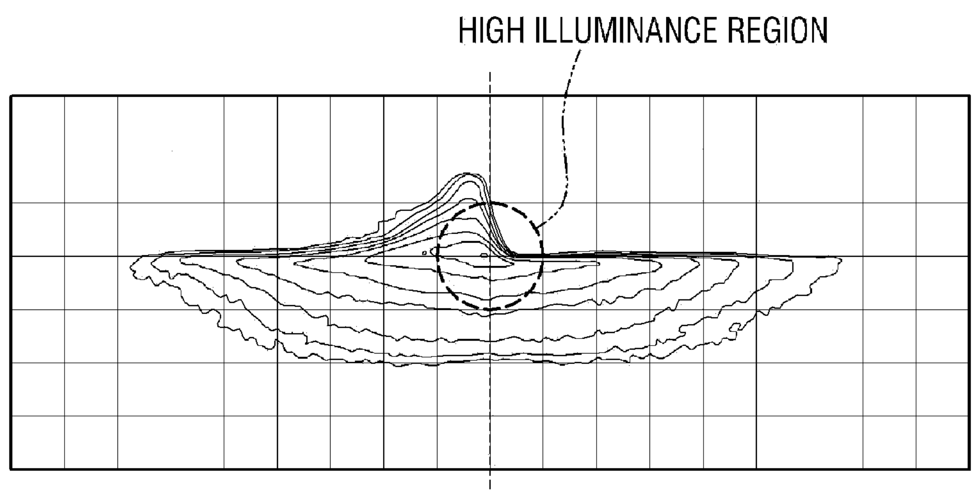
FIG. 19 is a schematic diagram of a high illuminance region according to an exemplary embodiment of the present invention.
Figure 20:
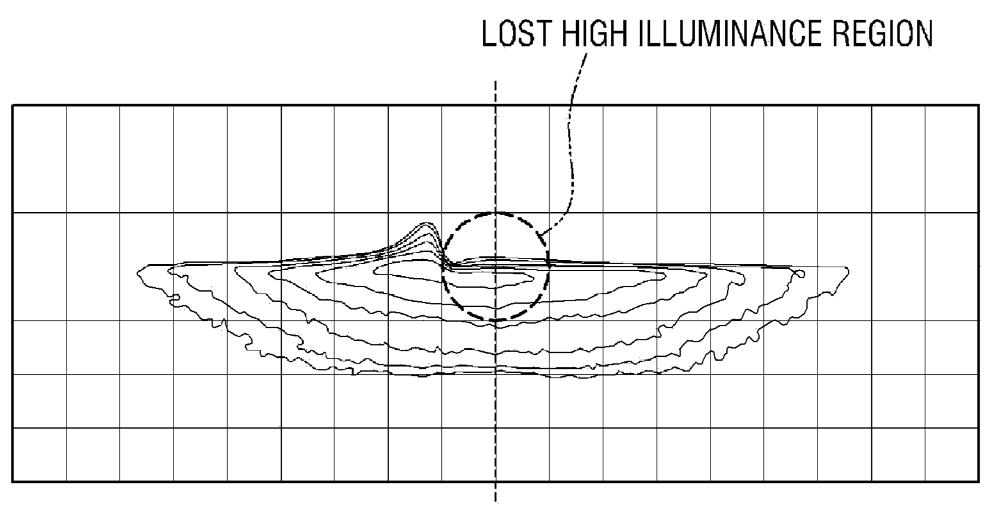
FIG. 20 is a schematic diagram of a high illuminance region lost by the rotation of the headlamp unit according to an exemplary embodiment of the present invention.

For example, when there is no front vehicle, the first headlamp 310 may have a high illuminance region as shown in FIG. 19. However, when the light blocking region of the first headlamp 310 is increased according to the position of a front vehicle, the high illuminance region may be lost as shown in FIG. 20. Since a high illuminance region of the second headlamp 320 is maintained even when the high illuminance region of the first headlamp 310 is lost by the increased light blocking region of the first headlamp 310, maximum possible visibility can be ensured for the driver of the vehicle 10 by rotating the second headlamp 320 in the inward direction of the vehicle 10.

In the illustrative embodiment, when one or more of the first headlamp 310 and the second headlamp 320 are rotated in the inward direction of the vehicle 10 to form an optimum shadow zone, a shadow zone which does not contribute to the visibility of a front vehicle may be formed in an outward direction of the vehicle 10. To compensate for this shadow zone, auxiliary light sources may be installed.

For example, referring to FIG. 18, when a front vehicle 20 is a preceding vehicle in the same lane as the vehicle 10, the light blocking regions of the first and second headlamps 310 and 320 may be increased to form a shadow zone D. To optimize the shadow zone D, the first headlamp 310 and the second headlamp 320 may be rotated in the inward direction of the vehicle 10. However, the rotation of the first headlamp 310 and the second headlamp 320 may form a shadow zone in the outward direction of the vehicle 10. To compensate for this shadow zone, auxiliary light sources may be installed at outermost positions on the vehicle 10.

Figure 21:
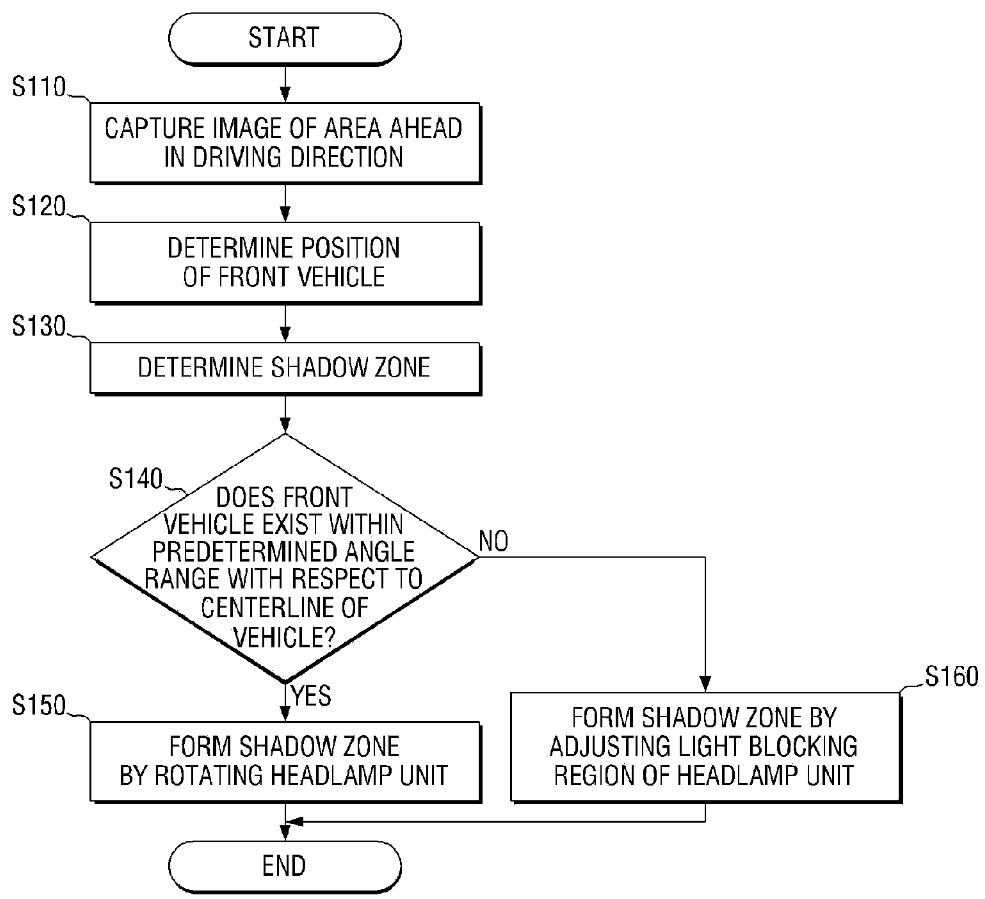
FIG. 21 is a flowchart illustrating an automotive headlamp control method according to an exemplary embodiment of the present invention.

FIG. 21 is a flowchart illustrating an automotive headlamp control method according to an embodiment of the present invention which may be performed by control logic installed across one or more units of the vehicle 10. Referring to FIG. 21, in the automotive headlamp control method according to the illustrative embodiment, an image capture unit 100 captures an image of an area in front of the direction of travel of the vehicle 10 (operation S110). When the image of the area in front of direction of travel is captured, a position determination unit 200 determines the position of a front vehicle based on the captured image (operation S120).

A control unit 400 then determines a shadow zone based on the determined position of the front vehicle (operation S130). Here, when multiple front vehicles exist, the control unit 400 may determine a shadow zone based on a leftmost vehicle and a rightmost vehicle.

When the front vehicle exists within a predetermined angular range with respect to a centerline of a vehicle 10 (operation S140), the control unit 400 forms the shadow zone by rotating a headlamp unit 300 (operation S150). When the front vehicle exists outside the predetermined angular range with respect to the centerline of the vehicle 10, the control unit 400 forms the shadow zone by adjusting a light blocking region of the headlamp unit 300 (operation S160).

In FIG. 21, a case where a shadow zone is formed by rotating the headlamp unit 300 or adjusting the light blocking region of the headlamp unit 300 according to the position of a front vehicle is described as an example. However, this is merely an example used to help understand the present invention, and the present invention is not limited to this example. That is, the shadow zone can be formed by rotating the headlamp unit 300 and adjusting the light blocking region of the headlamp unit 300 according to the number of front vehicles or the position of a front vehicle. For example, when there are multiple front vehicles and when some of the front vehicles exist within a predetermined angular range while the other front vehicles exist outside the predetermined angular range, the shadow zone may be formed by rotating the headlamp unit 300 and adjusting the light blocking region of the headlamp unit 300.

Figure 22:
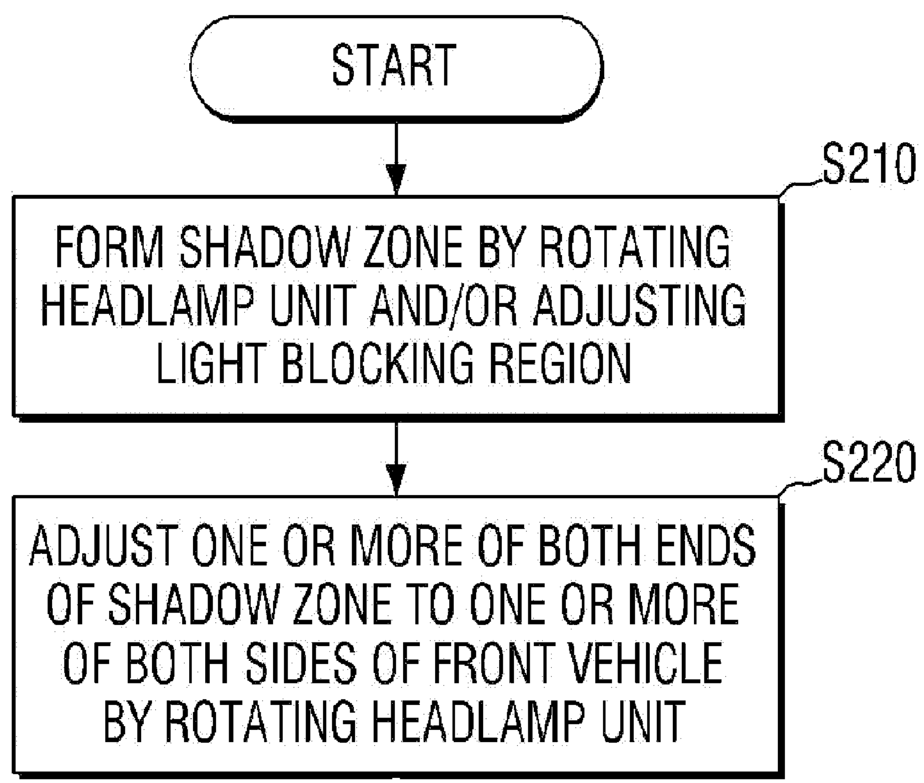
FIG. 22 is a flowchart illustrating a method of optimizing a shadow zone according to an exemplary embodiment of the present invention.

FIG. 22 is a flowchart illustrating a method of optimizing a shadow zone according to an embodiment of the present invention. Referring to FIG. 22, in the method of optimizing a shadow zone according to the illustrative embodiment, a shadow zone is formed by rotating the headlamp unit 300 and/or adjusting the light blocking region of the headlamp unit 300 according to the position of a front vehicle (operation S210). Then, any one of both ends of the shadow zone is adjusted to a corresponding side of the front vehicle by rotating the headlamp unit 300 (operation S220).

For example, when there is only one front vehicle, a shadow zone may be formed by rotating the headlamp unit 300 and/or adjusting the light blocking region of the headlamp unit 300 according to the position of the front vehicle. Then, when the shadow zone is wider than the front vehicle, one or more of both ends of the shadow zone may be adjusted to one or more of both sides of the front vehicle by rotating the headlamp unit 300.

When there are multiple front vehicles, a distance between a leftmost front vehicle and a rightmost front vehicle may be determined as a width of the front vehicles. In this case, both ends of a shadow zone may be adjusted to a left side of the leftmost front vehicle and a right side of the rightmost front vehicle by rotating the headlamp unit 300, thereby optimizing the shadow zone.

In FIG. 22, when a shadow zone formed before operation S210 is narrower than the front vehicle, it indicates that the forming of the shadow zone has not been performed normally. Therefore, a shadow zone may be formed by repeating the determining of the position of the front vehicle and the determining of the shadow zone in FIG. 21. Then, the shadow zone may be optimized as illustrated in FIG. 22.

An automotive headlamp control apparatus and method according to the present invention provide at least one of the following advantages.

First, an illumination pattern of a headlamp unit which blocks a part of light emitted from a light source and projects the other part of the light is controlled by rotating the headlamp unit and/or adjusting a light blocking region of the headlamp unit based on the position of a front vehicle located ahead of a vehicle in a driving direction. Therefore, the illumination pattern can be controlled rapidly according to the position of the front vehicle, thereby reducing the time required to control the illumination pattern. In addition, when the illumination pattern is controlled by adjusting the light blocking region, an optimum illumination pattern can be formed by rotating the headlamp unit. Accordingly, this can ensure maximum possible visibility for the driver of the vehicle and protect the visibility of the front vehicle located ahead of the vehicle in the driving direction.

Furthermore, since a shadow zone, which is formed by the rotation of the headlamp unit based on the position of the front vehicle and does not contribute to the visibility of the front vehicle, can be compensated for, the visibility of the driver of the vehicle can be improved. However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The scope of the present invention is defined by the following claims, rather than by the above-described detailed description. The meanings and scope of the claims, and all modifications or modified shapes, which are derived from equivalent concepts thereof, should be understood as being included in the scope of the present invention.

What is claimed is:

1. An automotive headlamp control apparatus comprising:

an image capture unit configured to capture an image of an area in front of a traveling direction of a subject vehicle;

a position determination unit configured to determine, based on the captured image, a position of a vehicle or positions of vehicles in front of the subject vehicle;

a headlamp unit that is configured to be rotated and includes a light source and a light blocking unit for blocking at least a part of a light emitted from the light source, wherein the light blocking unit is movable relative to the light source; and a control unit configured to control the illumination pattern of the headlamp unit to form a shadow zone by:

(a) performing one of (i) rotating the headlamp unit and (ii) blocking at least a portion of a light emitted from the light source, if the position of a vehicle in front of the subject vehicle is within a predetermined angular range with respect to the longitudinal centerline of the subject vehicle:

(b) performing the other of (i) rotating the headlamp unit and (ii) blocking at least a portion of a light emitted from the light source, if the position of a vehicle in front of the subject vehicle is outside the predetermined angular range with respect to the longitudinal centerline of the subject vehicle; and (c) performing both (i) rotating the headlamp unit and (ii) blocking at least a portion of a light emitted from the light source, if there are multiple vehicles in front of the subject vehicle, at least one of the multiple vehicles is within the predetermined angular range, and at least one of the multiple vehicles is outside the predetermined angular range and/or adjusting a light blocking region of the headlamp unit based on the determined position of the front vehicle.

2. The apparatus of claim 1, wherein the headlamp unit comprises a light blocking unit which blocks at least a part of light emitted from the light source, wherein the light blocking unit comprises:

a cylindrical rotatable body;

a first blocking portion which is installed on the body and blocks at least a part of light according to an illumination pattern corresponding to driving conditions of the vehicle; and a second blocking portion which is formed on a side of the first blocking portion and blocks at least a part of light according to an illumination pattern for providing high beams.

3. The apparatus of claim 2, wherein the control unit controls the illumination pattern for the high beams by adjusting the light blocking region formed by the second blocking portion by rotating the cylindrical rotatable body according to the position of the front vehicle or vehicles.

4. The apparatus of claim 2, wherein the second blocking portion comprises a step portion which is angled from a lengthwise-axis direction of the body.

5. The apparatus of claim 4, wherein the step portion has an end formed in a middle of the body and extends along a circumference of the body to become close to an end of the body.

6. The apparatus of claim 1, wherein the headlamp unit comprises a first headlamp and a second headlamp, wherein the first headlamp and the second headlamp each are configured to be rotated and include a light source and a light blocking unit for blocking at least a part of a light emitted from the light source, wherein the light blocking unit is movable relative to the light source.

7. The apparatus of claim 6, wherein when at least one of the front vehicles exists within the predetermined angular range, the control unit forms the shadow zone by rotating the first headlamp, the second headlamp, or both.

8. The apparatus of claim 6, wherein when at least one of the front vehicles exists outside the predetermined angular range, the control unit forms the shadow zone by blocking at least a part of a light emitted from the light source of the first headlamp, blocking at least a part of a light emitted from the light source of the second headlamp, or blocking at least a part of lights emitted from the light sources of the first headlamp and the second headlamp.

9. The apparatus of claim 7, wherein the control unit adjusts one or more of both ends of the shadow zone to one or more of both sides of the front vehicle or vehicles by rotating at least one of the first headlamp and the second headlamp.

10. The apparatus of claim 1, wherein when there are multiple front vehicles, the control unit forms the shadow zone based on a leftmost front vehicle and a rightmost front vehicle.

11. The apparatus of claim 1, further comprising auxiliary light sources installed at outermost positions on the vehicle and driven when the headlamp unit rotates in an inward direction of the vehicle.

12. An automotive headlamp control method comprising:

capturing, by an image capturing unit, an image of an area in front of the traveling direction of a subject vehicle;

determining, by a position determining unit, a position of a vehicle or positions of vehicles in front of the subject vehicle based on the captured image; and controlling, by a control unit, an illumination pattern of a headlamp unit to form a shadow zone, wherein the headlamp is configured to be rotated and includes a light source and a light blocking unit for blocking at least a part of a light emitted from the light source, wherein the light blocking unit is movable relative to the light source, by performing:

(a) one of (i) rotating the headlamp unit and (ii) blocking at least a portion of a light emitted from the light source, if the position of a vehicle in front of the subject vehicle is within a predetermined angular range with respect to the longitudinal centerline of the subject vehicle;

(b) the other of (i) rotating the headlamp unit and (ii) blocking at least a portion of a light emitted from the light source, if the position of a vehicle in front of the subject vehicle is outside the predetermined angular range with respect to the longitudinal centerline of the subject vehicle; and (c) both (i) rotating the headlamp unit and (ii) blocking at least a portion of a light emitted from the light source, if there are multiple vehicles in front of the subject vehicle, at least one of the multiple vehicles is within the predetermined angular range, and at least one of the multiple vehicles is outside the predetermined angular range and/or adjusting a light blocking region of the headlamp unit based on the determined position of the front vehicle.

13. The method of claim 12, wherein the headlamp unit comprises a first headlamp and a second headlamp, wherein the first headlamp and the second headlamp each are configured to be rotated and include a light source and a light blocking unit for blocking at least a part of a light emitted from the light source, wherein the light blocking unit is movable relative to the light source.

14. The method of claim 13, wherein the controlling of the illumination pattern comprises forming a shadow zone by rotating the first headlamp and the second headlamp and/or adjusting the light blocking region according to the determined position of the front vehicle.

15. The method of claim 14, wherein the controlling of the illumination pattern comprises forming the shadow zone by rotating the first headlamp, the second headlamp, or both when at least one of the front vehicles exists within the predetermined angular range, the control unit forms the shadow zone.

16. The method of claim 14, wherein the controlling of the illumination pattern comprises forming the shadow zone by blocking at least a part of a light emitted from the light source of the first headlamp, blocking at least a part of a light emitted from the light source of the second headlamp, or blocking at least a part of lights emitted from the light sources of the first headlamp and the second headlamp, when at least one of the front vehicles exists outside the predetermined angular range.

17. The method of claim 15, wherein the controlling of the illumination pattern comprises adjusting one or more of both ends of the shadow zone to one or more of both sides of the front vehicle or vehicles by rotating at least one of the first headlamp and the second headlamp.

18. the apparatus of claim 12, wherein the controlling of the illumination pattern comprises forming the shadow zone based on a leftmost front vehicle and a rightmost front vehicle when there are multiple front vehicles.

19. The method of claim 12, further comprising compensating for a shadow zone formed in an outward direction of the vehicle by rotation of the headlamp unit in an inward direction of the vehicle.

20. A non-transitory computer readable medium containing program instructions executed by a processor or controller, the computer readable medium comprising:

program instructions that receive an image of an area in front of the traveling direction of a subject vehicle captured by an image capturing unit;

program instructions that determine, based on the captured image, a position of a vehicle or positions of vehicles in front of the subject vehicle; and program instructions that control an illumination pattern of a headlamp unit to form a shadow zone, wherein the headlamp unit is configured to be rotated and includes a light source and a light blocking unit for blocking at least a part of a light emitted from the light source, wherein the light blocking unit is movable relative to the light source, by performing:

(a) one of (i) rotating the headlamp unit and (ii) blocking at least a portion of a light emitted from the light source, if the position of a vehicle in front of the subject vehicle is within a predetermined angular range with respect to the longitudinal centerline of the subject vehicle;

(b) the other of (i) rotating the headlamp unit and (ii) blocking at least a portion of a light emitted from the light source, if the position of a vehicle in front of the subject vehicle is outside the predetermined angular range with respect to the longitudinal centerline of the subject vehicle; and (c) both (i) rotating the headlamp unit and (ii) blocking at least a portion of a light emitted from the light source, if there are multiple vehicles in front of the subject vehicle, at least one of the multiple vehicles is within the predetermined angular range, and at least one of the multiple vehicles is outside the predetermined angular range and/or adjusting a light blocking region of the headlamp unit based on the determined position of the front vehicle.

* * * * *